United States Patent
Harris et al.

(10) Patent No.: US 11,775,695 B2
(45) Date of Patent: Oct. 3, 2023

(54) IMAGE REDACTION FOR A DISPLAY DEVICE

(71) Applicant: International Business Machines Corporation, Armonk, NY (US)

(72) Inventors: Clive Harris, Ropley (GB); Timothy Andrew Moran, Southampton (GB); Caroline Sarah Courtenay McNamara, Hants (GB); Caroline J. Thomas, Eastleigh (GB); Natasha Katherine McKenzie-Kelly, Salisbury (GB); Melita Saville, Winchester (GB); Abigail Rose Bettle-Shaffer, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/393,376

(22) Filed: Aug. 3, 2021

(65) Prior Publication Data
US 2023/0041623 A1  Feb. 9, 2023

(51) Int. Cl.
G06F 21/60 (2013.01)
G06F 21/84 (2013.01)
G06T 7/00 (2017.01)

(52) U.S. Cl.
CPC ............ *G06F 21/84* (2013.01); *G06F 21/606* (2013.01); *G06T 7/0002* (2013.01)

(58) Field of Classification Search
CPC ...... G06F 21/84; G06F 21/606; G06T 7/0002
See application file for complete search history.

(56) References Cited

U.S. PATENT DOCUMENTS

| | | | |
|---|---|---|---|
| 9,519,794 B2 | 12/2016 | Fox | |
| 10,474,840 B2* | 11/2019 | Powell | H04L 63/20 |
| 10,498,767 B1* | 12/2019 | Khetawat | H04L 65/1083 |
| 2009/0015591 A1* | 1/2009 | Tanaka | G09G 5/399 |
| | | | 345/547 |
| 2009/0025063 A1 | 1/2009 | Thomas | |
| 2010/0268813 A1* | 10/2010 | Pahlavan | G06T 1/20 |
| | | | 709/227 |
| 2011/0202850 A1 | 8/2011 | Chan | |
| 2012/0036452 A1 | 2/2012 | Coleman | |

(Continued)

OTHER PUBLICATIONS

Anonymous, "A method or System to allow Confidential Instant Messaging session ensuring Privacy," IP.com, Disclosure No. IPCOM000239286D, Oct. 27, 2014, 3 pages. <https://ip.com/IPCOM/000239286>.

(Continued)

*Primary Examiner* — Hien L Duong
(74) *Attorney, Agent, or Firm* — Jared C. Chaney (57) ABSTRACT

A system may be used to redact an image to be displayed by a display device. By intercepting a signal before an image of the signal is displayed on a display device, the display of confidential, sensitive and inappropriate information may be suppressed. More specifically, the image of the signal is analyzed using a content recognition algorithm to identify items of content, which may be redacted by modifying the signal. Using this concept, the image may be redacted by the display device, or by a port or adapter between a signal generator and the display device, without relying on redaction software local to the signal generation system.

16 Claims, 8 Drawing Sheets

(56) References Cited

U.S. PATENT DOCUMENTS

| | | | |
|---|---|---|---|
| 2018/0189517 A1* | 7/2018 | Larson | G06F 21/60 |
| 2018/0307871 A1* | 10/2018 | Rollins | G09G 3/38 |
| 2021/0194888 A1* | 6/2021 | Bhaskar S | H04L 63/102 |
| 2022/0229919 A1* | 7/2022 | Klabunde | H04L 65/403 |
| 2022/0335154 A1* | 10/2022 | Schuler | G06N 7/01 |

OTHER PUBLICATIONS

Anonymous, "Method for easing the sharing of document with sensitive content in a video conference," IP.com, Disclosure No. IPCOM000261292D, Feb. 18, 2020, 4 pages. <https://priorart.ip.com/IPCOM/000261292>.

Anonymous, "Method of web screen sharing privacy protection," IP.com, Disclosure No. IPCOM000245428D, Mar. 9, 2016, 6 pages. <https://priorart.ip.com/IPCOM/000245428>.

Anonymous, "Method to hide sensitive documents in screen sharing," IP com, Disclosure No. IPCOM000253129D, Mar. 7, 2018, 4 pages. <https://priorart.ip.com/IPCOM/000253129>.

Anonymous, "Privacy for Instant-Message or Email Popups," IP.com, Disclosure No. IPCOM000180738D, Mar. 16, 2009, 3 pages. <https://ip.com/IPCOM/000180738>.

* cited by examiner

IMAGE REDACTION FOR A DISPLAY DEVICE

BACKGROUND

The present disclosure relates generally to redacting images, and more particularly to redacting images for a display device.

It is increasingly common for users to share content from their computers with other users. This may be done intentionally, for example when giving a presentation, or screen sharing during a video meeting. On the other hand this may be unintentional, such as when being overlooked while working on a train.

BRIEF SUMMARY

The present disclosure provides a method for redacting an image to be displayed by a display device.

The present disclosure further provides a computer program comprising computer program code means which is adapted, when said computer program is run on a computer, to implement a method for redacting an image to be displayed by a display device.

The present disclosure also provides a system for redacting an image to be displayed by a display device.

According to an aspect of the present disclosure, a method is provided for redacting an image to be displayed by a display device. The method comprises intercepting a signal comprising an image to be displayed by a display device before the image is displayed by the display device, analyzing the image based on a content recognition algorithm to identify an item of content in the image, determining whether the item of content should be redacted based on a ruleset, and modifying the signal to redact the item of content from the image responsive to determining that the item of content should be redacted.

According to another aspect of the disclosure, a computer program is provided comprising computer program code means which is adapted, when said computer program is run on a computer, to implement a method for redacting an image to be displayed by a display device.

According to yet another aspect of the disclosure, a system is provided for redacting an image to be displayed by a display device. The system comprises an interface unit configured to intercept a signal comprising an image to be displayed by a display device before the image is displayed by the display device, an image analysis unit configured to analyze the image based on a content recognition algorithm to identify an item of content in the image, and a reduction unit configured to determine whether the item of content should be redacted based on a ruleset, and modify the signal to redact the item of content from the image responsive to determining that the item of content should be redacted.

Concepts are proposed for redacting information in images (e.g. still images or frames of a video) for display on a display device. In particular, by intercepting a signal comprising an image before being displayed on a display device, any unintentional display of confidential and/or sensitive information may be avoided.

Further, as redaction of information according to a ruleset is performed on an intercepted signal, the method may be implemented in a display screen itself (or in cables and adapters connecting the display screen to the signal generating equipment), rather than in an application or operating system that generates the signal. Thus, it may be possible to provide a display device which prevents the display of specified private content, even if the user accidently or deliberately attempts to display such content.

These and other aspects of the disclosure will be apparent from and elucidated with reference to the embodiment(s) described hereinafter.

DETAILED DESCRIPTION

It should be understood that the detailed description and specific examples, while indicating exemplary embodiments of the apparatus, systems and methods, are intended for purposes of illustration only and are not intended to limit the scope of the disclosure. These and other features, aspects, and advantages of the apparatus, systems and methods of the present disclosure will become better understood from the following description, appended claims, and accompanying drawings. It should be understood that the Figures are merely schematic and are not drawn to scale. It should also be understood that the same reference numerals are used throughout the Figures to indicate the same or similar parts.

Variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. If the term "adapted to" is used in the claims or description, it is noted the term "adapted to" is intended to be equivalent to the term "configured to".

In the context of the present application, where embodiments of the present disclosure constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Implementations in accordance with the present disclosure relate to various techniques, methods, schemes and/or solutions pertaining to redacting an image to be displayed by a display device. In particular, by intercepting a signal (e.g. video signal) comprising an image before the image is displayed, items of content of the image may be redacted by modifying the signal, improving security of the display. Put another way, an image of the signal may be analyzed so as to identify confidential and/or sensitive information, and the signal may then be altered so as to remove such information for display by the display device.

There are many circumstances where users are not able to firmly control what information they communicate. In such circumstances, confidential information may be presented that the user does not wish to be publicly available. By way of example, the user may have forgotten to delete sensitive information from a slide before presenting it. Further, users often receive visual notifications as they work on a computer which may contain confidential or inappropriate information for wider viewership.

Therefore, automatic (e.g., autonomous and/or substantially immediate) redaction of such information may help to avoid embarrassment and potential security breaches. Indeed, many applications currently have integrated redaction software in order to avoid these undesirable consequences. For instance, some conventional systems have very targeted redaction mechanisms that are used to hide or obscure small sets of known sensitive information that exists at predetermined locations by generating a signal such that this predetermined sensitive information is impossible, such as an online peer-to-peer seller websites hiding userIDs of previous buyers and sellers when presenting the transaction history for a user. However, outside of these very targeted approaches used to generate signals with known sensitive information redacted, it may be technically impossible for these conventional systems to identify, much less obscure/hide/redact, sensitive information of an already-generated signal before it is displayed on a display screen. Therefore, a more general technique for the redaction of confidential, sensitive or inappropriate content in images is required.

Embodiments of the proposed disclosure provide a modified signal which may not contain any confidential information for display on a display device. This is achieved by intercepting a signal before an image of the signal is displayed by the display device, analyzing the image to identify items of content, determining whether the item of content should be redacted based on a ruleset, and modifying the signal responsive to determining that the item of content should be redacted. Accordingly, a display device may be controlled to not display confidential and/or sensitive information, improving the security of the display device, and reducing the chance of inappropriate content being shared in a given context.

In other words, some embodiments of the disclosure are based on the realization that, by intercepting the signal after it is generated by an image generator and before it is displayed by a display device, automatic redaction of the image may be performed such that the display device is prevented from displaying confidential information defined by a ruleset. This may even be the case if the user accidently, or deliberately, attempts to display such information.

Also, by basing the decision regarding whether to redact an item or content on a ruleset, different decisions may be made in different contexts or based on a variety of preferences.

By way of further explanation, some embodiments of the disclosure provide analysis and redaction of an image into the display device, removing the dependence on any signal generation system (such as an operating system or application) to implement the redaction. This may prove advantageous when implemented in a display that is intended for use in group settings (such as in an auditorium or meeting room), and more particularly in an organization which desires the suppression of classified information. Put another way, because it may be implemented in a display device, it does not require users to be running special software, or even require them to be aware of the redaction rules for the venue in which they are trying to display information.

In yet further embodiments, the intercepted signal (for example, a video signal) may be converted into an image, such as a virtual display bitmap. This can be analyzed using existing redaction techniques that are typically used before the signal is generated. If this virtual display bitmap contains information that should be redacted, a modified signal is generated and transmitted for display. In some cases, an earlier frame of the signal may be looped (and/or a duration of a plurality of earlier frames may be extended, such that a set of frames that would typically take 0.005 seconds to display are stretched to instead take 0.01 seconds to display) if the processing time required to analyze the virtual display bitmap and modify the signal is longer than the refresh rate of the screen. While this may result in a lag of the displayed information, in many contexts the desirability of preventing sensitive information from reaching the display may be justified.

Put another way, the disclosure may be embodied by an input processing loop, and a display loop. The input processing loop may generate modified signals with redacted content for display. This may be achieved by:

(i) Receiving an input signal from a display controller before the input signal is displayed. The input signal would typically drive a single refresh of the physical screen display.

(ii) Generating a virtual display bitmap from the input signal, which is not displayed to the user.

(iii) Analyzing the virtual display bitmap using image recognition techniques (for example, optical character recognition (OCR), or facial recognition) in order to determine whether the virtual display bitmap contains redactable information. The type of information which is deemed redactable is specified in a ruleset specific to the display device. By way of example, this may include text and numbers in a known format, such as bank account numbers, number plates, addresses, and names. This may further include faces in images. Further, the ruleset may be dependent on constituent members of the audience, or a location of the display device.

(iv) Redacting information responsive to determining that the virtual display bitmap contains redactable information in order to produce a modified output signal. This may be achieved by preventing output of the signal entirely, blanking or obscuring the redactable information, and replacing the redactable information with randomized or anonymized content.

(v) Using the input signal as the output signal responsive to determining that virtual display bitmap contains no redactable content.

The display loop then uses the modified, or unmodified output signal as the next signal to be displayed by the display device. In particular, the physical screen is refreshed with the output of the input processing loop. For each refresh interval of the display device, this may be achieved by:
 (i) Displaying the most recent output signal.
 (ii) Continuing to display the most recent output signal while the input processing loop is processing an input signal.
 (iii) Driving the input processing loop with the most recently received input signal, received from a signal generator.

In some embodiments, intercepting the signal comprises controlling a display controller of the display device to intercept the signal before the image is displayed by the display device.

In this way, the method is performed at the display device, meaning that redaction software does not need to be run by the system (for example, an operating system or an application) which generates the signal. Accordingly, the method can be implemented in a display that is intended for use in group settings, where an organization owning such a display wishes for certain information to never be displayed.

Put another way, the display controller may be independent from a signal generating system. Therefore, it is not necessary for local redaction to occur, in the form of special software. Indeed, it may not even be necessary for a user to be aware of the redaction rules.

In some embodiments, the ruleset is based on at least one of individual user preferences, manufacturer specifications, organization requirements or government restrictions.

In this way, the ruleset may be adapted to given users/interested parties. For example, an individual user may be more relaxed about information to be displayed, whereas an organization may want more information to be redacted. Indeed, this may also enable manufacturers to produce different displays for different environments. For example, it would be desirable for a display to be employed in a home office to have a different ruleset compared to a display in an auditorium.

Put another way, by having a ruleset dependent on individual user preferences, manufacturer specifications, organization requirements or government restrictions, the choice of which information to be redacted may be more appropriate, In some embodiments, the ruleset is dependent on an operational context of the display device.

By having the ruleset dependent on an operational context of the display device, the method may adapt to redact an appropriate amount of information for the given circumstances. By way of example, it will be desirable to redact more information when the display device is in a situation with hundreds of viewers in a webinar, than when the display device is only being viewed by an administrator in their home office.

In some embodiments, the operational context of the display device may represent at least one of: a number of potential viewers of the display device, a location of the display device, a function of the display device, and a network connection of the display device.

By basing the operational context on these quantifiable variables, an increasingly accurate ruleset may be determined for the given circumstances, leading to an improved image redaction method.

In some embodiments, the image is a virtual display bitmap, and the method further comprises a step of generating the virtual display bitmap from the signal for analysis of the virtual display bitmap.

Further, it may be desirable to convert the image to a virtual display bitmap to simplify the analysis by a content recognition algorithm. This may improve the speed and accuracy of analysis of the virtual display bitmap. Indeed, there exists a large number of known image redaction techniques that may be performed on a virtual display bitmap.

In some embodiments, the method further comprises a step of transmitting the modified signal to the display device. For example, where computing components external to the display device generate the modified signal, these external computing components may transmit the modified signal to the display device. Conversely, where the display device includes the computing components that generate the modified signal, there may be no need for these computing components (that are internal to the display device) to transmit the modified signal to itself.

Thus, the modified signal which may contain no confidential, sensitive or inappropriate content is displayed to the user(s).

In some embodiments, the method further comprises a step of displaying, by the display device, a previous image corresponding to a previous signal until the modified signal is transmitted to the display device.

In some cases, the analysis and redaction process may take longer than a refresh cycle of the display device. If this is the case, the most recently modified signal should be displayed by the display device until a latest modified signal is available. Otherwise, some frames displayed by the display device may contain confidential information. This lag, or "choppiness" may often be justified in order to ensure security of confidential information.

In some embodiments, the content recognition algorithm comprises one or more of an OCR algorithm, an object recognition algorithm, and a facial recognition algorithm.

By basing the content recognition algorithm on these character, object, and facial recognition algorithms, all content which may potentially be confidential, sensitive or inappropriate may be captured for potential redaction.

In some embodiments, the item of content comprises at least one of a name, an address, a date of birth, a location, a userID, an email address, a password, confidential material, bank details, an image of a face, and a number plate.

In some embodiments, redacting the item of content comprises one of nullifying the item of content, blanking the item of content, replacing the item of content, scrambling the item of content, and removing the item of content.

In some contexts, it may be appropriate to nullify, blank, replace, scramble, or remove the item of content. For example, scrambling the item of content may be more computationally expensive than simplify nullifying the item of content. However, nullifying the item of content may also draw more attention to the redacted content.

Figure 1:
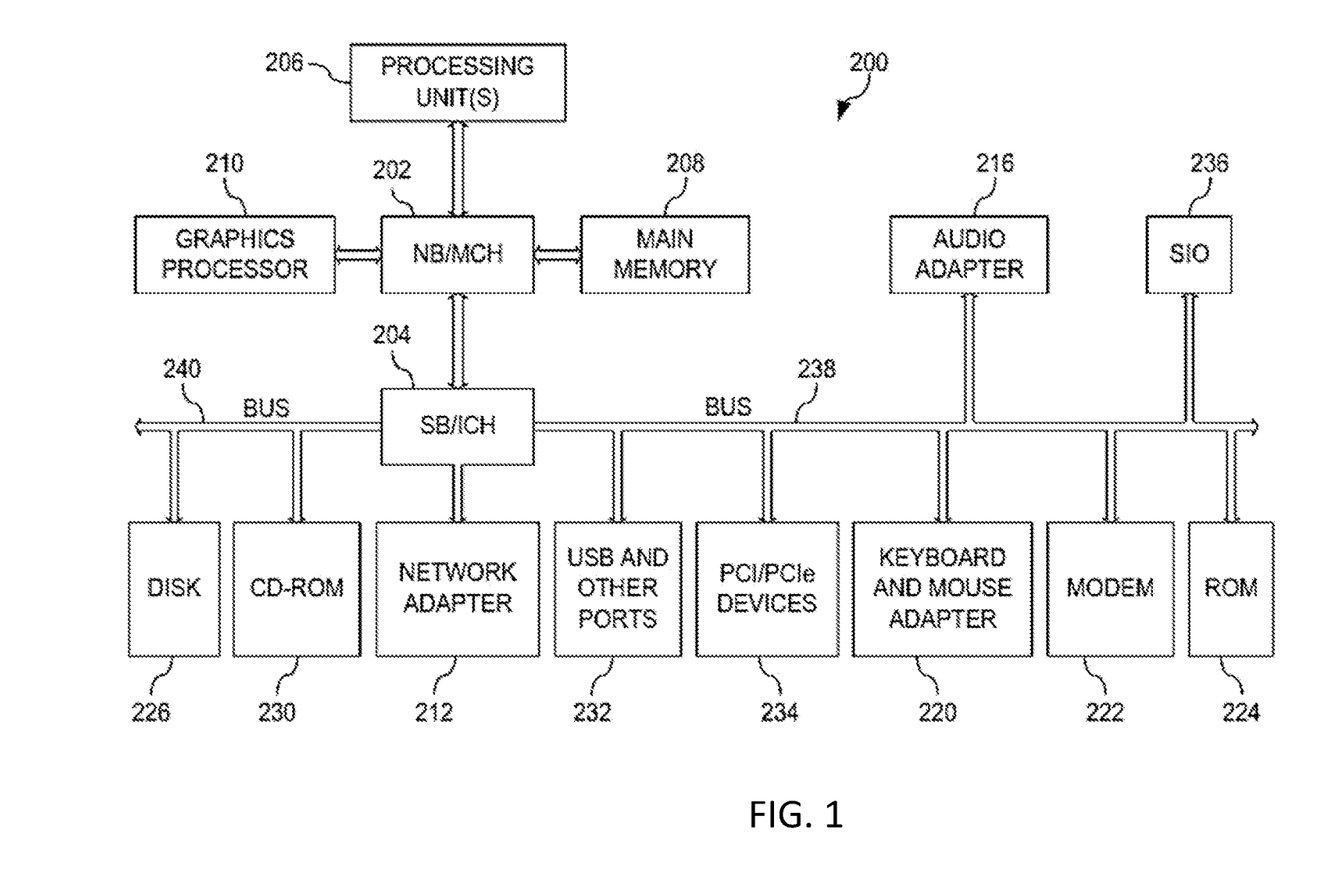
FIG. 1 is a block diagram of an example system in which aspects of the illustrative embodiments may be implemented.

Turning now to FIG. 1, there is presented a block diagram of an example system 200 in which aspects of the illustrative embodiments may be implemented. The system 200 is an example of a computer, such as client in a distributed processing system, in which computer usable code or instructions implementing the processes for illustrative embodiments of the present disclosure may be located. For instance, the system 200 may be configured to implement an interface unit, an image analysis unit, and a redaction unit according to an embodiment.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) ports and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present disclosure may be performed by processing unit 206 using computer usable program code, which may be located in a memory such as, for example, main memory 208, ROM 224, or in one or more peripheral devices 226 and 230.

Figure 2:
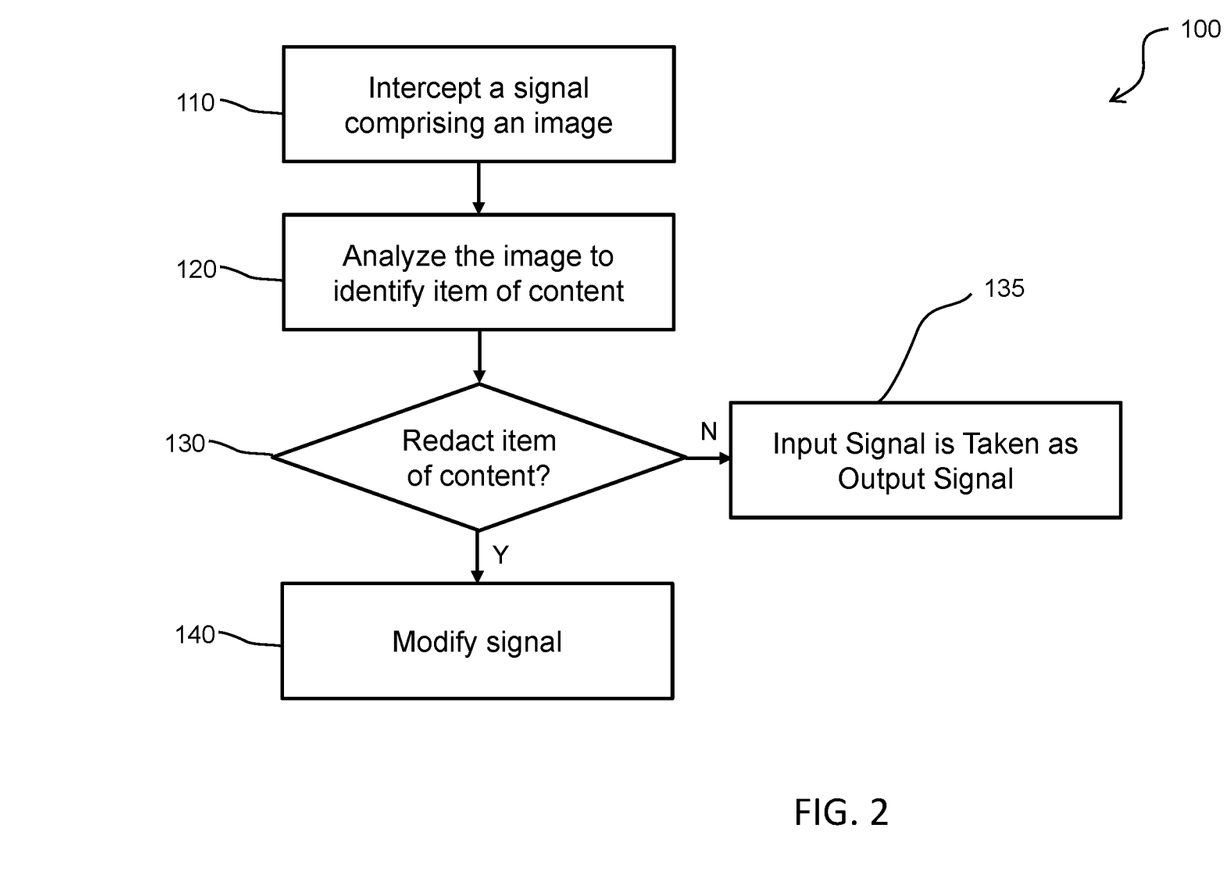
FIG. 2 is a flow diagram of a method for redacting an image to be displayed by a display device according to various embodiments.

A bus system, such as first bus 238 or second bus 240 as shown in FIG. 2, may comprise one or more buses. Of course, the bus system may be implemented using any type of communication fabric or architecture that provides for a transfer of data between different components or devices attached to the fabric or architecture. A communication unit, such as the modem 222 or the network adapter 212 of FIG. 1, may include one or more devices used to transmit and receive data. A memory may be, for example, main memory 208, ROM 224, or a cache such as found in NB/MCH 202 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the system mentioned previously, without departing from the spirit and scope of the present disclosure.

Moreover, the system 200 may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Referring now to FIG. 2, there is presented a flow diagram 100 of a method for redacting an image to be displayed by a display device according to various embodiments.

At step 110, a signal comprising an image to be displayed by a display device is intercepted before the image is displayed by the display device. In this way, the image of the signal may not be displayed by the display device before being intercepted, analyzed, and potentially redacted. The redacting of the signal provides a technique for filtering out confidential, sensitive, and inappropriate information so the information is not displayed unintentionally, or deliberately, by a user.

By way of explanation, the signal may be any signal containing information for the presentation of an image on a display. More particularly, the signal may be a video signal from a signal generating system, such as an operating system or an application.

Further, the step of intercepting the signal may comprise controlling a display controller of the display device to intercept the signal before the image is displayed by the display device. In this way, the signal may be acquired before it is displayed by the display device, but after the signal is generated by a signal generator, such as an operating system or an application. The display controller of the display device may be integrated in the display device, or it may be implemented in an adapter, such as a high-definition multimedia interface (HDMI) adapter. Indeed, the display controller may be any component associated with the display device which is independent from the system which generates the signal.

In other words, the display controller may be implemented:
  (i) In the display screen itself. In this way, a signal that arrives through a port in the display device is intercepted before an image is displayed.
  (ii) At any point between the signal generator sending port, and the receiving port of the display screen. By way of example, the display controller may be implemented in an adapter for a port of the sending device, a port of the display device, in the cable, server or web service through which the signal is sent.
  (iii) In the device sending the signal. By way of example, a signal ready for transmission through a graphics port on a laptop could be intercepted by a display controller before leaving the laptop.

The display device may be a computer screen, a phone screen, a projector screen, or any screen which may be viewed by one or more user.

At step 120, the image is analyzed based on a content recognition algorithm to identify an item of content in the image. In other words, items of content of the image, which may be of interest for potential redaction, are recognized by a content recognition algorithm.

By way of example, the item of content may comprise at least one of a name, an address, a date of birth, a location, a userID, an email address, a password, confidential material, bank details, an image of a face, and a number plate. Indeed, any item of content of the image may be identified which may contain redactable information. Put simply, the item of content may include any potentially confidential, sensitive, or inappropriate information.

In some cases, the content recognition algorithm may comprise one or more of an optical character recognition (OCR) algorithm, an object recognition algorithm, and a facial recognition algorithm. In this way, any item of content may be identified, whether it is text or image based. It should be understood that any algorithm capable of identifying items of content of an image may be employed in this method.

At step 130, it is determined whether the item of content should be redacted based on a ruleset. Some items of content of the image may not be confidential, sensitive, or inappropriate for display, and therefore should not be redacted. However, items of content which are confidential, sensitive, or inappropriate should be redacted. Indeed, any information that a user, organization or manufacturer wishes to suppress may be redacted if this is written into the ruleset.

If it is determined to redact the item of content, then the method moves to step 140. If it is determined not to redact the item of content, then, at step 135, the signal is not modified, and the input signal is taken as the output signal.

In some embodiments, the ruleset may be based on at least one of individual user preferences, manufacturer specifications, organization requirements or government restrictions. Individual user preferences may include not wanting to share images of faces, or personal information such as an email address. By way of further example, an organization may have rules which do not allow the sharing of a location. These preferences may be defined by a ruleset in order to define which items of content should be redacted, and which should be displayed by the display device.

Further, the ruleset is dependent on an operational context of the display device. Put another way, it may be desirable for the ruleset to be context dependent. It may be the case that the ruleset may be configured such that it is stricter (or redacts more items of content), in a context where the display device is viewable by a large number of unknown viewers. Conversely, the ruleset may be relaxed when the display is only viewable by a single user in a private room.

In the case that the ruleset is dependent on an operational context of the display device, the operational context of the display device may represent at least one of a number of potential viewers of the display device, a location of the display device, a function of the display device, and a network connection of the display device. Indeed, the skilled person would understand that the operational context may represent more variables than those listed here. Any variable of an operational context may be accounted of by the ruleset in order to provide an appropriate redaction in the given circumstances.

At step 140, responsive to determining that the item of content should be redacted, the signal is modified to redact the item of content from the image. The signal may be modified to redact the item of content by any known method.

In this way, if the modified signal is subsequently used to display the image, an item of content which is inappropriate, confidential, or sensitive may not be displayed. Thus, a display image without any such inappropriate, confidential, or sensitive content may be provided.

By way of explanation, redacting the item of content may comprise one of nullifying the item of content, blanking the item of content, replacing the item of content, scrambling the item of content, and removing the item of content. The method of redacting the item of content may be dependent on a type of item of content. For example, the system may determine to replace an email address with a generic email address in order to represent the presence of an original email address, but to entirely remove a password for security purposes. Indeed, in some cases the system may determine to blank the whole image.

Figure 3:
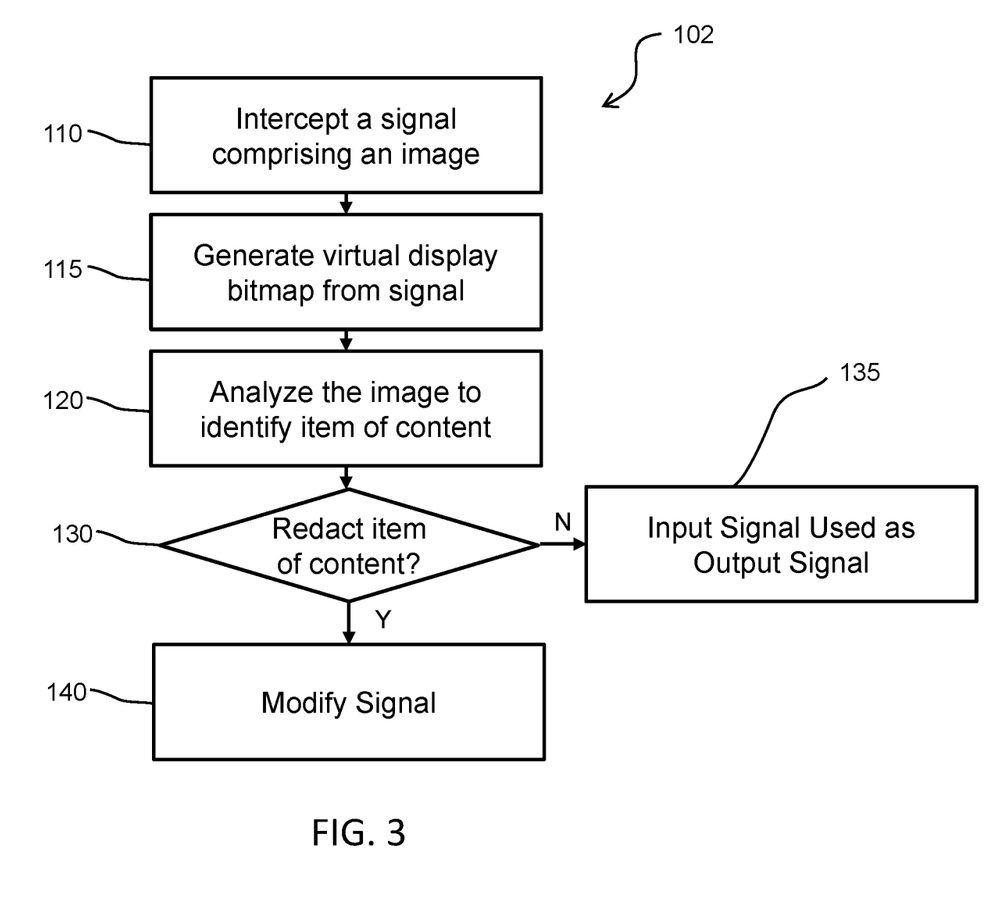
FIG. 3 is a flow diagram of method for redacting an image to be displayed by a display device according to an another exemplary embodiment.

FIG. 3 shows an alternative example flow diagram 103 of a method for redacting an image to be displayed by a display device according to another exemplary embodiment, similar to flow diagram 102 in FIG. 2. Steps 110, 120, 130, and 140 are similar to steps 110, 120, 130, 135, and 140 of FIG. 2, thus further explanation of these steps is omitted here.

At step 115, a virtual display bitmap is generated from the signal for subsequent analysis and redaction. In this case, image is a virtual display bitmap. The virtual display bitmap may be generated from the signal based on any known method. The virtual display bitmap may not be displayed to a user, but is simply a virtual image used for simplified analysis to identify content of interest.

Figure 4:
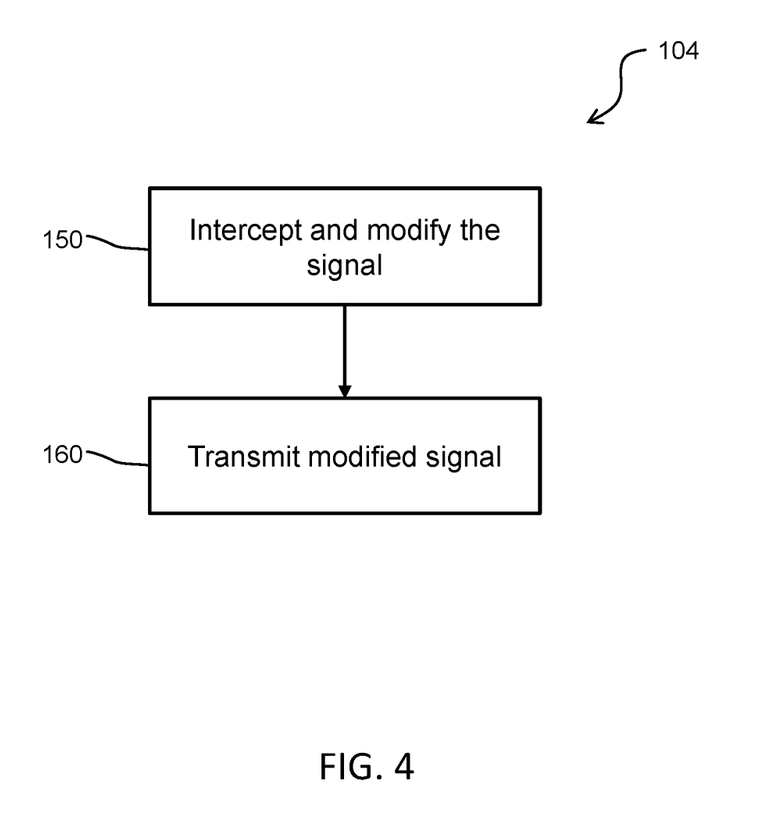
FIG. 4 is a flow diagram of a method of intercepting, modifying and transmitting signal according to an aspect of various embodiments.

FIG. 4 presents a flow diagram 104 of a method of intercepting, modifying, and transmitting a signal according to aspects of various embodiments. In some embodiments, the example method represented in FIG. 4 may be in addition to the example methods described in FIG. 2 and FIG. 3. In this flow diagram step 150 represents any method described in relation to FIG. 2 and FIG. 3, which results in a modified signal.

Further, in step 160, the modified signal is transmitted to the display device. The display device may then display the redacted image based on the modified signal, such that no confidential, inappropriate or sensitive information is displayed.

Figure 5:
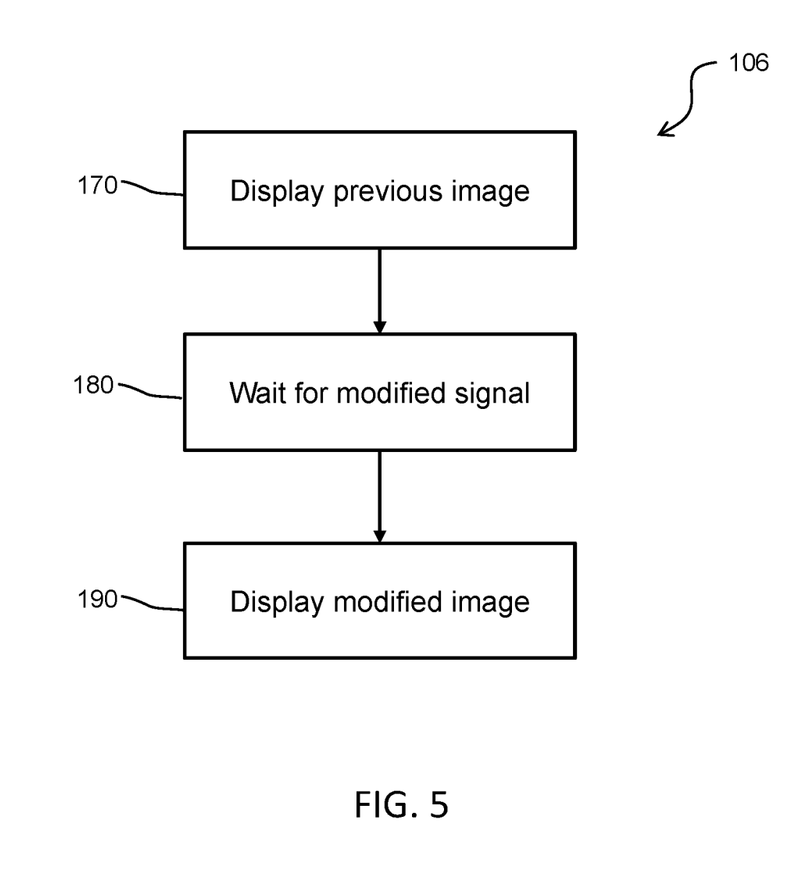
FIG. 5 is a flow diagram of a method of controlling a display device according to an aspect of various embodiments.

Next, FIG. 5 presents a flow diagram 106 of a method of controlling a display device according to an aspect of various embodiments. In some embodiments, the example method represented in FIG. 4 may be in addition to the example methods described in FIG. 2 and FIG. 3.

At step 170, the display device displays a previous image corresponding to a previous signal (e.g., where the previous image is any image of a previous signal, where the previous signal may be a signal that immediately preceded the signal of step 150). The previous signal may be a previously modified signal using any method of generating a modified signal as described above. In this case, the display device only shows an image which has undergone a redaction process, and therefore no confidential information may be presented.

At step 180, the method pauses until a modified signal is received. While this may mean that the previous image is presented for an extended amount of time, this disadvantage may be offset by the security ensured by redacting each incoming image to be displayed by the display device.

At step 190, a modified signal may be received or otherwise obtained using any of the methods described above. A modified image corresponding to the modified signal is displayed by the display device. This method may be looped by the display device.

Figure 6:
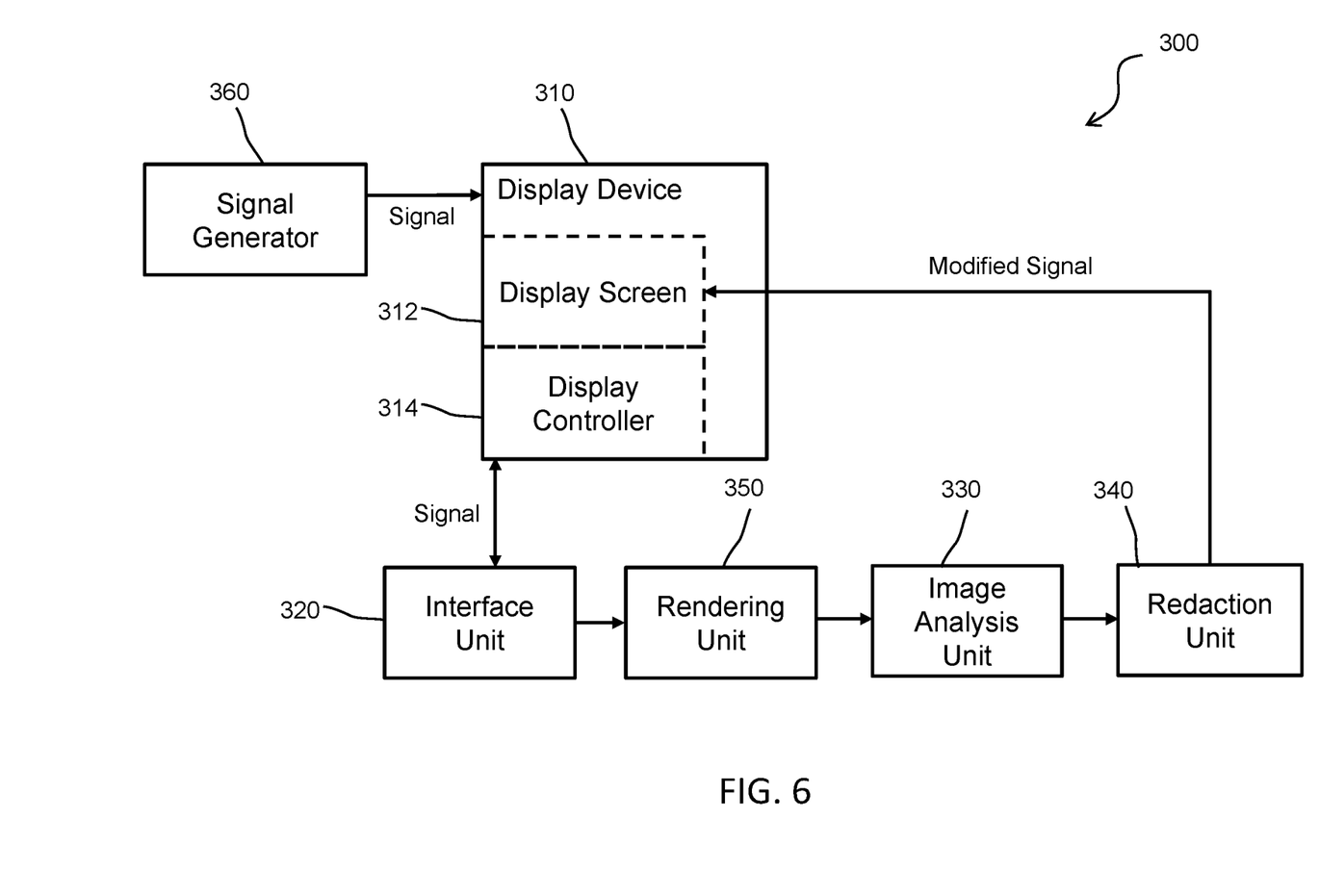
FIG. 6 is a block diagram of various embodiments of a system for redacting an image to be displayed by a display device.

Turning now to FIG. 6, is a block diagram 300 of an exemplary embodiment of a system for redacting an image to be displayed by a display device 310 is depicted. The system includes an interface unit 320, an image analysis unit 330, and a redaction unit 340. Further, the system may optionally include a rendering unit 350, a signal generator 360, and a display device 310 comprising a display screen 312 and a display controller 314.

Firstly, the interface unit 320 is configured to intercept a signal comprising an image to be displayed by the display device 310 before the image is displayed by the display device 310. In some embodiments, the interface unit 320 may be further configured to control the display controller 314 of the display device 310 to intercept the signal before the image is displayed by the display device 310. In yet further embodiments, the display controller 314 may be controlled by the interface unit 320 to intercept the signal generated by a signal generator 360 before it is displayed on the display screen 312 of the display device 310.

Optionally, the interface unit 320 may transmit the signal to the rendering unit 350. The rendering unit 350 may be configured to generate a virtual display bitmap from the signal for analysis of the virtual display bitmap by the image analysis unit 330. However, the interface unit 320 may instead transmit the signal directly to the image analysis unit 330, which may determine an image from the signal using any known method.

The image analysis unit 330 is configured to analyze the image based on a content recognition algorithm in order to identify an item of content in the image.

The redaction unit 340 is configured to determine whether the item of content should be redacted based on a ruleset, and modify the signal to redact the item of content from the image responsive to determining that the item of content should be redacted. The redaction unit 340 may store the ruleset locally, or it may access external memory to obtain the ruleset. Alternatively, the ruleset may be entered into the redaction unit 340 by a user.

Finally, the modified signal may then be transmitted from the redaction unit 340 to the display screen 312 of the display device 310, for display to one or more users.

Figure 7:
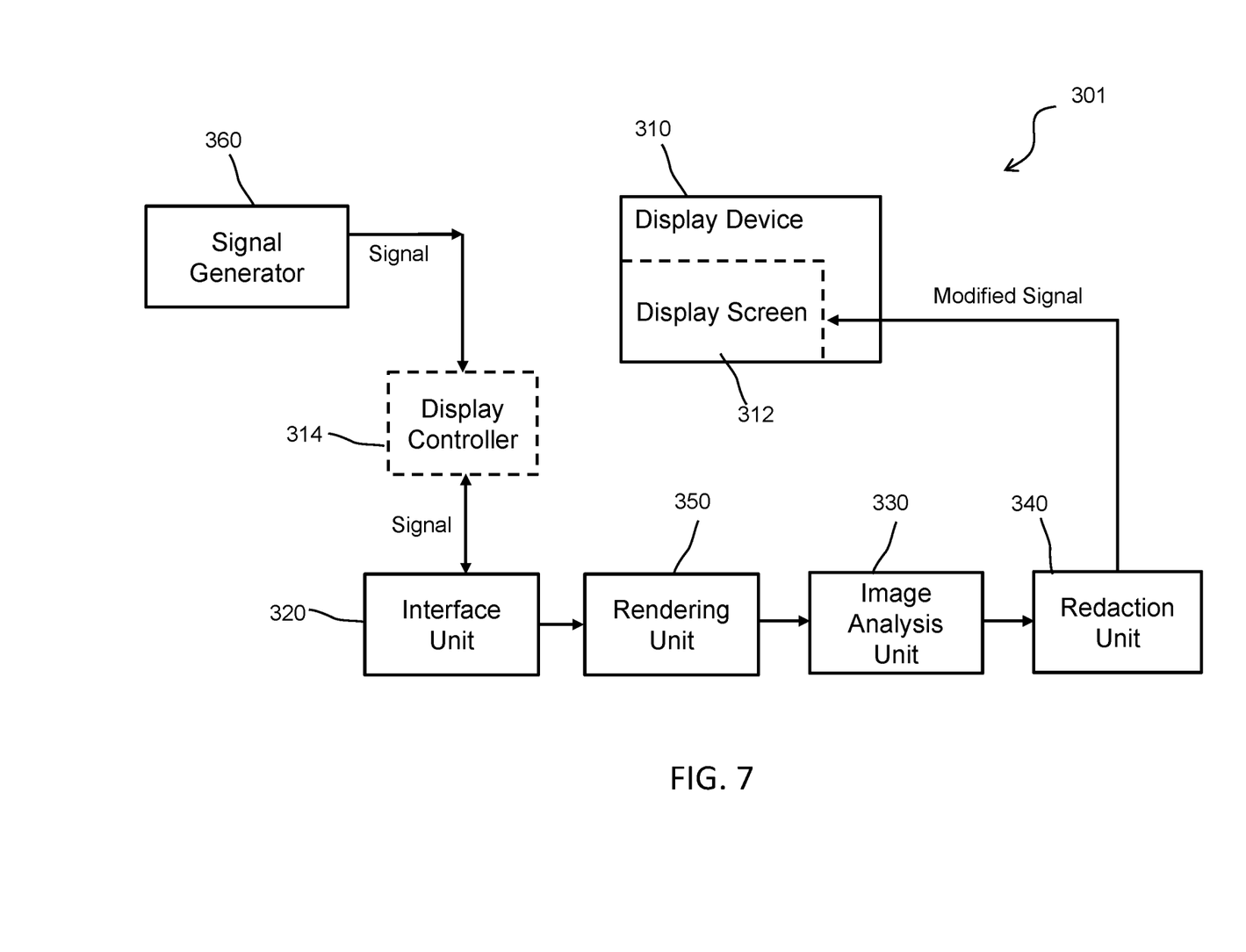
FIG. 7 is a block diagram a further exemplary embodiment of a system for redacting an image.

FIG. 7 presents a block diagram 301 of an alternative embodiment of a system for redacting an image to be displayed by a display device 310. The system is similar to the system of FIG. 6. Therefore, further description of the interface unit 320, image analysis unit 330, redaction unit 340, rendering unit 350, signal generator 360, and display device 310 comprising the display screen 312 has been omitted here.

However, differently to FIG. 6, the display controller 314 of FIG. 7 is provided such that it may intercept the signal before the signal reaches the display device. In other words, the display controller 314 may be implemented in a device independent of the display device 310. In this case, the signal may be processed and modified before reaching the display device 310. By way of example, the display controller 314, interface unit 320, rendering unit 350, image analysis unit 330, and redaction unit 340 may be provided in a cable, port or an external adapter. Indeed, these components may be provided anywhere, as long as the interface unit 320 is capable of intercepting the signal before the image is displayed by the display device 310.

Figure 8:
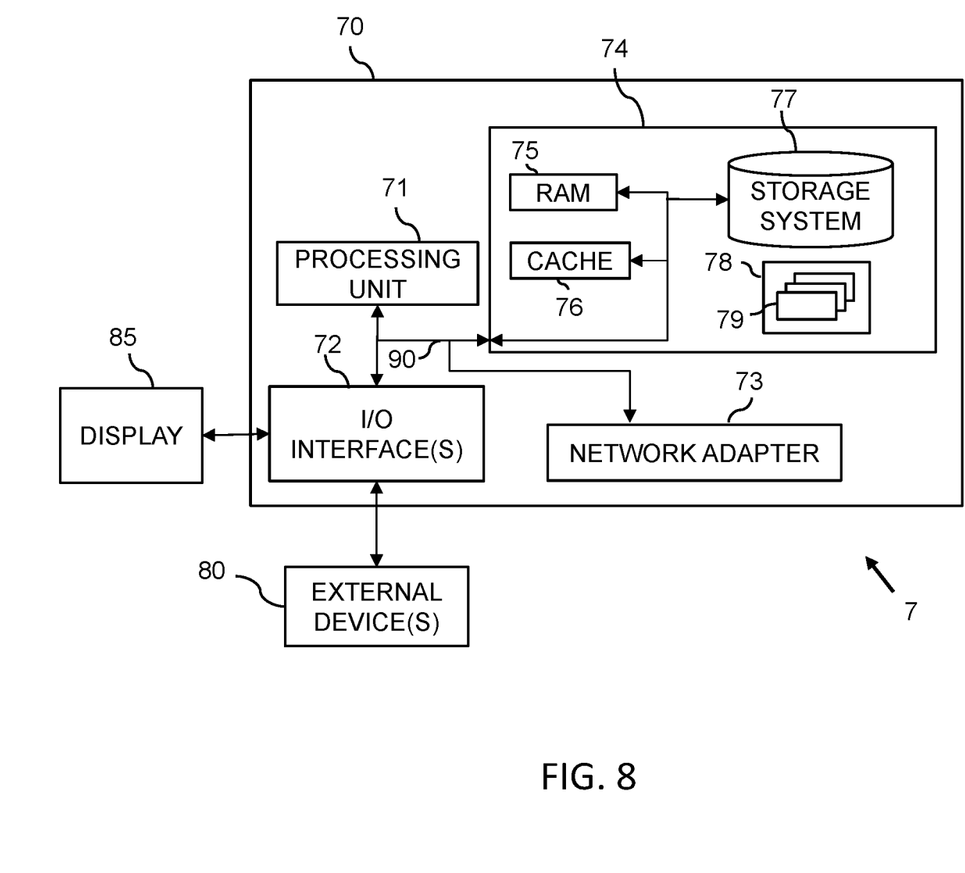
FIG. 8 is a simplified block diagram of a computer system on which the method for redacting an image may be executed.

By way of further example, as illustrated in FIG. 8, embodiments may comprise a computer system 70, which may form part of a networked system 7. For instance, a system for redacting an image to be displayed by a display device may be implemented by the computer system 70. The components of computer system/server 70 may include, but are not limited to, one or more processing arrangements, for example comprising processors or processing units 71, a system memory 74, and a bus 90 that couples various system components including system memory 74 to processing unit 71.

System memory 74 can include computer system readable media in the form of volatile memory, such as random access memory (RAM) 75 and/or cache memory 76. Computer system/server 70 may further include other removable/non-removable, volatile/non-volatile computer system storage media 77. In such instances, each can be connected to bus 90 by one or more data media interfaces. The memory 74 may include at least one program product having a set (e.g., at least one) of program modules that are configured to carry out the functions of proposed embodiments. For instance, the memory 74 may include a computer program product having program executable by the processing unit 71 to cause the system to perform, a method for detecting a scene transition in video footage according to a proposed embodiment.

Program/utility 78, having a set (at least one) of program modules 79, may be stored in memory 74. Program modules 79 generally carry out the functions and/or methodologies of proposed embodiments for detecting a scene transition in video footage.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73 (e.g. to communicate recreated content to a system or user).

In the context of the present application, where embodiments of the present disclosure constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The mere fact that certain measures are recited in mutually different dependent claims does not indicate that a combination of these measures cannot be used to advantage.

Any reference signs in the claims should not be construed as limiting the scope.

The invention claimed is:

1. A method comprising:
receiving, by a dedicated display device, a signal comprising an image to be displayed by the dedicated display device before the image is displayed by the dedicated display device,
wherein the signal is received from a client computing device,
wherein the dedicated display device is external to the client computing device;

converting, by the dedicated display device, the image into a virtual bitmap display;
analyzing, by the dedicated display device, the virtual bitmap display based on a content recognition algorithm to identify an object in the virtual bitmap display;
determining, by the dedicated display device, to redact the object based on a ruleset;
determining that a processing time required to analyze the virtual bitmap display and modify the signal is longer than a refresh rate of the dedicated display device;
looping, based on the determination the processing time required to analyze the virtual bitmap display and modify the signal is longer than the refresh rate of the dedicated display device, an earlier frame on the dedicated display device; and
modifying, by the dedicated display device, the signal to redact the object from the virtual bitmap display responsive to determining to redact the object.

2. The method of claim 1, wherein the receiving the signal further comprises controlling a display controller of the dedicated display device to intercept the signal before the image is displayed by the dedicated display device.

3. The method of claim 1, wherein the ruleset is based on at least one item selected from the group consisting of individual user preferences, manufacturer specifications, organization requirements, and government restrictions.

4. The method of claim 1, wherein the ruleset is dependent on an operational context of the dedicated display device.

5. The method of claim 4, wherein the operational context of the dedicated display device is selected from the group consisting of a number of potential viewers of the dedicated display device, a location of the dedicated display device, a function of the dedicated display device, and a network connection of the dedicated display device.

6. The method of claim 1, further comprising a step of transmitting the modified signal to the dedicated display device.

7. The method of claim 1, wherein the content recognition algorithm comprises one or more of an optical character recognition, OCR, algorithm, and an object recognition algorithm.

8. The method of claim 1, wherein the object is selected from the group consisting of a name, an address, a date of birth, a location, a userID, an email address, a password, confidential material, bank details, an image of a face, and a number plate.

9. The method of claim 1, wherein redacting the object comprises one of nullifying the object, blanking the object, replacing the object, scrambling the object and removing the object.

10. The method of claim 1, wherein the object is selected from the group consisting of a face, a person, and a physical object.

11. The method of claim 1, wherein the modifying the item of content is dependent on a type of item of content.

12. A computer program product comprising a computer readable storage medium having program instructions embodied therewith, the program instructions executable by a processor to cause the processors to perform a method, the method comprising:
receiving by a dedicated display device, a signal comprising an image to be displayed by the dedicated display device before the image is displayed by the dedicated display device,
wherein the signal is received from a client computing device,
wherein the dedicated display device is external to the client computing device;
converting, by the dedicated display device, the image into a virtual bitmap display;
analyzing, by the dedicated display device, the virtual bitmap display based on a content recognition algorithm to identify an object in the virtual bitmap display;
determining, by the dedicated display device, to redact the object based on a ruleset;
determining that a processing time required to analyze the virtual bitmap display and modify the signal is longer than a refresh rate of the dedicated display device;
looping, based on the determination the processing time required to analyze the virtual bitmap display and modify the signal is longer than the refresh rate of the dedicated display device, an earlier frame on the dedicated display device; and
modifying, by the dedicated display device, the signal to redact the object from the virtual bitmap display responsive to determining to redact the object.

13. The computer program product of claim 12, wherein the receiving the signal further comprises controlling a display controller of the dedicated display device to intercept the signal before the image is displayed by the dedicated display device.

14. The computer program product of claim 12, wherein the ruleset is dependent on an operational context of the dedicated display device.

15. The computer program product of claim 12, the method further comprising a step of transmitting the modified signal to the dedicated display device.

16. A system comprising:
an interface unit configured to intercept a signal comprising an image to be displayed by a dedicated display device before the image is displayed by the dedicated display device;
an image analysis unit configured to analyze a virtual bitmap display based on a content recognition algorithm to identify an object in the virtual bitmap display,
wherein the signal is received from a client computing device,
wherein the interface unit is external to the client computing device; and
a redaction unit configured to:
convert, by the dedicated display device, the image into the virtual bitmap display;
determine to redact the object based on a ruleset;
determine that a processing time required to analyze the virtual bitmap display and modify the signal is longer than a refresh rate of the dedicated display device;
looping, based on the determination the processing time required to analyze the virtual bitmap display and modify the signal is longer than the refresh rate of the dedicated display device, an earlier frame on the dedicated display device; and
modify the signal to redact the object from the virtual bitmap display responsive to determining to redact the object.

* * * * *